Rice & Tozer,
Saw-Mill Head-Block.
Nº 13,043. Patented June 12, 1855.
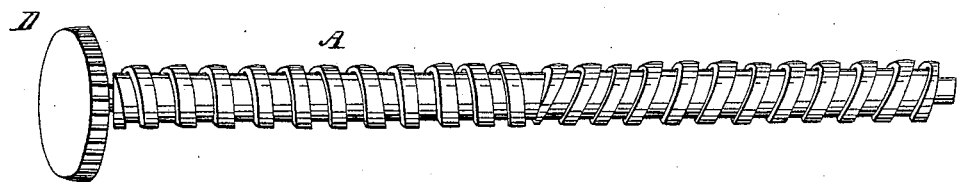
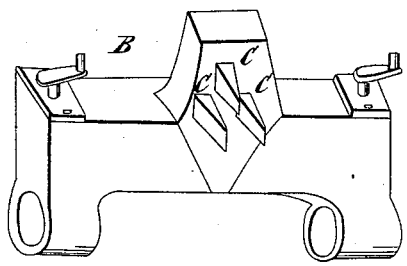
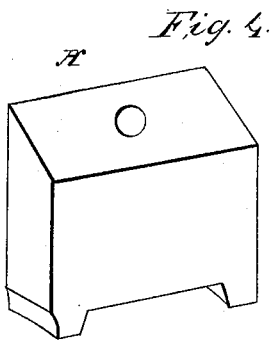
Fig. 4.
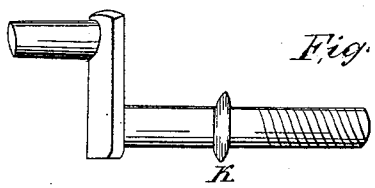
Fig. 2
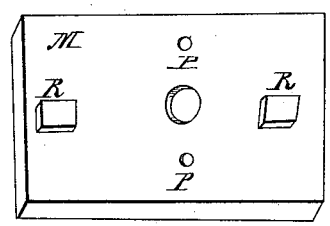
Fig. 5
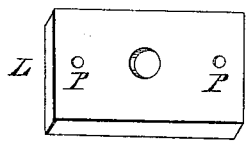
Fig. 3

UNITED STATES PATENT OFFICE.

A. S. RICE AND GUY TOZER, OF BARTON, NEW YORK.

SAWMILL-DOG.

Specification of Letters Patent No. 13,043, dated June 12, 1855.

*To all whom it may concern:*

Be it known that we, ANDREW S. RICE and GUY TOZER, of the town of Barton, Tioga county, State of New York, have invented a new and Improved Kind of Self-Setting Sawmill-Dog, in the use of which lumbermen are enabled to saw their lumber of a uniform thickness; and we do hereby declare that the following is a full, clear, and exact description of the construction and operation of the same, reference being had to the annexed drawings, making a part of this specification, in which—

A represents an iron screw with a right and left hand thread cut on it, both threads terminating near the center of the screw.

B represents the movable head, having teeth $c$ $c$ $c$, which take into the log as it lies on the carriage to be sawed. In each end of the movable head B, are chambers, in which the sectional nut N, Fig. 4, (which is full size,) moves up and down. These nuts, one at a time, are let down into their corresponding threads in the screw A and as the carriage is gigged back, the wheel D on the end of the screw takes into corresponding cogs lying on a movable piece of timber by the side of the carriage and turns the screw, moving the head B, together with the log, on toward the saw, the distance moved varying according to the number of cogs put upon the movable piece of timber by the side of the carriage, each cog representing one sixteenth of an inch in the lumber to be sawed, the same in the pitch of the screw.

H, Fig. 2, represents the crank shaft with a thread cut on the lower end, which takes into the sectional nut, it having a corresponding thread to match.

At K, Fig. 2, is a collar that works between the two plates L, M. The plate M is put onto the top of the crank shaft before the crank. The plate L, Fig. 3, is put onto the other end and the two plates are riveted together by the holes P P P P. They are made fast to the movable head B by the bolts R R, Fig. 5.

H, Fig. 2, L, Fig. 3, N, Fig. 4, and M, Fig. 5, are represented full size.

All the parts of the above described machine are made of iron.

We do not claim the cog wheel D, on the screw A, or the cogs by which the wheel is moved; but We do claim—

The combination of right and left hand screw A in connection, with the movable head B together with the sectional nut N, and the manner of operating the same substantially in the manner specified.

ANDREW S. RICE.
GUY TOZER.

Witnesses:
H. C. HUBBERT,
R. G. CRANE.